(12) United States Patent  
Martin et al.

(10) Patent No.: US 8,518,606 B2  
(45) Date of Patent: Aug. 27, 2013

(54) CATALYST THIN LAYER AND METHOD FOR FABRICATING THE SAME

(75) Inventors: Steve Martin, Saint-Sauveur (FR); Riccardo D'agostino, Bari (IT); Antoine Latour, Grenoble (FR); Antonella Milella, Bari (IT); Fabio Palumbo, Casamassima (IT); Jessica Thery, Fontaine (FR)

(73) Assignees: Commissariat a l'energie Atomique et aux Energies Alternatives, Paris (FR); Universita Degli Studi di Bari, Bari (IT)

( * ) Notice: Subject to any disclaimer, the term of this patent is extended or adjusted under 35 U.S.C. 154(b) by 0 days.

(21) Appl. No.: 13/129,020

(22) PCT Filed: Nov. 12, 2008

(86) PCT No.: PCT/IB2008/003693  
§ 371 (c)(1),  
(2), (4) Date: May 12, 2011

(87) PCT Pub. No.: WO2010/055365  
PCT Pub. Date: May 20, 2010

(65) Prior Publication Data  
US 2011/0217628 A1 Sep. 8, 2011

(51) Int. Cl.  
*H01M 4/02* (2006.01)

(52) U.S. Cl.  
USPC ............ 429/524; 429/526; 429/530; 429/535

(58) Field of Classification Search  
None  
See application file for complete search history.

(56) References Cited

U.S. PATENT DOCUMENTS

| | | | |
|---|---|---|---|
| 2001/0041277 A1* | 11/2001 | Chang | 429/30 |
| 2004/0038808 A1 | 2/2004 | Hampden-Smith et al. | |
| 2005/0064276 A1 | 3/2005 | Sugawara et al. | |
| 2005/0221134 A1* | 10/2005 | Liu et al. | 429/13 |
| 2007/0128489 A1* | 6/2007 | Koyama et al. | 429/30 |

FOREIGN PATENT DOCUMENTS

| | | |
|---|---|---|
| EP | 0 600 888 B1 | 8/1997 |
| EP | 1 137 090 A2 | 9/2001 |
| JP | A-2007-018844 | 1/2007 |
| JP | A-2007-287414 | 11/2007 |
| WO | WO 2005/013396 A1 | 2/2005 |
| WO | WO 2005013396 A1 * | 2/2005 |
| WO | WO 2006/063611 A1 | 6/2006 |
| WO | WO 2007/007771 A1 | 1/2007 |
| WO | WO 2007/119132 A1 | 10/2007 |
| WO | WO 2007/142364 A1 | 12/2007 |

OTHER PUBLICATIONS

Geng et al., "Dependence of Onset Potential for Methanol Electrocatalytic Oxidation on Steric Location of Active Center in Multicomponent Electrocatalysts," *J. Phys. Chem. C*, 2007, vol. 111, pp. 11897-11902.  
International Search Report in International Application No. PCT/IB2008/003693; dated May 18, 2009.  
English-language Translation of Mar. 8, 2013 Japanese Office Action issued in Japanese Patent Application No. 2011-543825.

* cited by examiner

*Primary Examiner* — Ula C Ruddock  
*Assistant Examiner* — Scott J Chmielecki  
(74) *Attorney, Agent, or Firm* — Oliff & Berridge, PLC

(57) ABSTRACT

The catalyst thin layer consists of electronically conductive catalyst nano-particles embedded in a polymeric matrix. The ratio number of catalyst atoms/total number of atoms in the catalyst layer is comprised between 40% and 90%, more preferably between 50% and 60%.

10 Claims, 4 Drawing Sheets

CATALYST THIN LAYER AND METHOD FOR FABRICATING THE SAME

The invention relates to a catalyst thin layer and a method for fabricating the same. The invention also concerns a catalytic electrode of a fuel cell comprising said catalyst thin layer.

BACKGROUND OF INVENTION

Catalyst thin layers are used in many applications to promote reactions. For example, they can be used in energetic systems, such as catalyst combustion systems or in sensor systems such as glucose, hydrogen or oxygen detectors, as well as in microsystems such as micro-electro-mechanical-systems (MEMs), LabOn-chips or micro fluidic systems. Catalyst thin layers are more specifically used in the fabrication of catalytic electrodes for fuel cell.

A basic structure of a fuel cell is schematically illustrated in FIG. 1. The fuel cell comprises an electrolytic material 1, that is sandwiched between two electrodes, for example, between a porous anode 2 and a porous cathode 3. An electrochemical reaction occurs between a fuel gas 4 and an oxidant gas 5. A hydrogen cell uses hydrogen as fuel and oxygen (usually from air) as oxidant. Other fuels include hydrocarbons and alcohols, as for example, glucose in abiotic biofuel. Other oxidants include air, chlorine and chlorine dioxide. Fuel cell electrodes may be made of metal, nickel or carbon nanotubes, and are generally coated with a catalyst layer 6 for higher efficiency in ion generation and conductive transfer. The input fuel gas 4 and the oxidant gas 5 flow respectively to the anode 2 and to the cathode 3 through gas supply pathways in plates 7. The input fuel gas 4 and the oxidant gas 5 are catalytically dissociated into ions and electrons in the anode 2 and in the cathode 3.

In solid polymer electrolyte fuel cell also known as proton exchange membrane (PEM) fuel cell, a proton exchange membrane (PEM) 1 constitutes the electrolytic material (FIG. 1). This membrane is sandwiched between the two electrodes, preferably covered by catalyst layers 6. The PEM 1 is proton permeable but constitutes an electrical insulator barrier. This barrier allows the transport of protons from the anode 2 to the cathode 3 through the PEM 1 but forces the electrons to travel around a conductive path to the cathode 3.

Catalyst layers 6 are preferably formed on both surfaces of the PEM 1 to promote electrochemical reactions. The performance data of such a fuel cell depends critically on the quality of the interface between catalyst layers 6 and the PEM 1.

In the prior art, catalyst layers 6 have been incorporated by hot pressing or by ink application directly onto the surface of the PEM 1.

As illustrated in FIG. 2, patent EP-B-0600888 and patent publication U.S. Patent Application No. 2005/0064276 disclose a catalyst layer 6 on a PEM 1 comprising catalyst nano-particles 8 of platinum supported on carbon particles 9 obtained from a homogeneous ink preparation. The latter comprises supported platinum catalyst nano-particles 8 uniformly disperse in a proton conducting material also called ionomer 10. Indeed, the carbon particles 9 of the above-mentioned catalyst layers, are ten to hundred times larger than catalyst metal nano-particles 8. The catalytic sites where the gas reaction takes place are therefore relatively small and, the three-phase interface and the catalyst content are not efficient enough.

Moreover, EP-B-1137090 discloses a method for forming a catalyst layer consisting in sputtering a catalytic metal and a carbon source on a PEM 1 to form, as illustrating in FIG. 3, a nanophase of catalyst nano-particles 8 and nano-sized carbon particles 9. Both catalyst nano-particles 8 and nano-sized carbon particles 9 have a preferred particle size of 2 to 10 nm.

In any case, the catalyst layer contains carbon particles, which have a bad conductivity i.e. a conductivity of less than $10^4$ S/m. Furthermore, the access to the catalytic sites might be difficult.

SUMMARY OF THE INVENTION

The object of the present invention is to provide an efficient catalyst thin layer, with high electronic conductivity and improved access to its catalyst sites.

This is attained by a catalyst thin layer according to the appended claims. This is more particularly obtained by a catalyst thin layer consisting of electronically conductive catalyst nano-particles embedded in a polymeric matrix, with a ratio number of catalyst atoms/total number of atoms is comprised between 40% and 90%, more preferably, between 50% and 60%.

Another object of the invention is to provide a method for fabricating such a catalyst thin layer.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
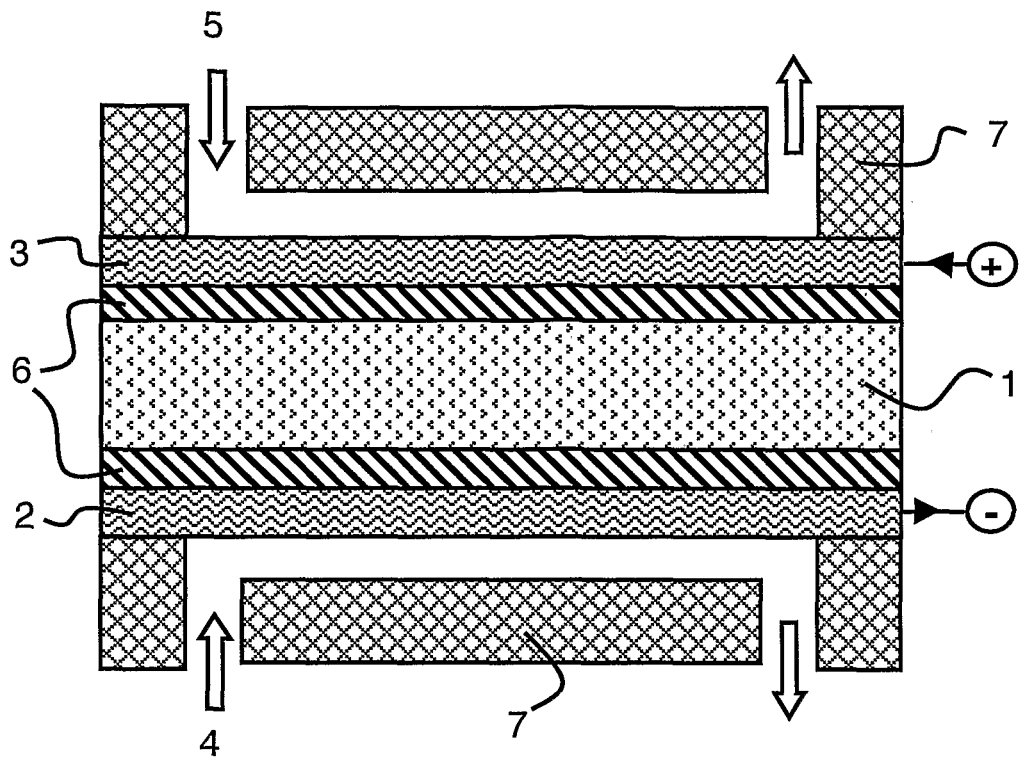
FIG. 1 is a cross-section schematically illustrating the structure of a conventional fuel cell.
Figure 2:
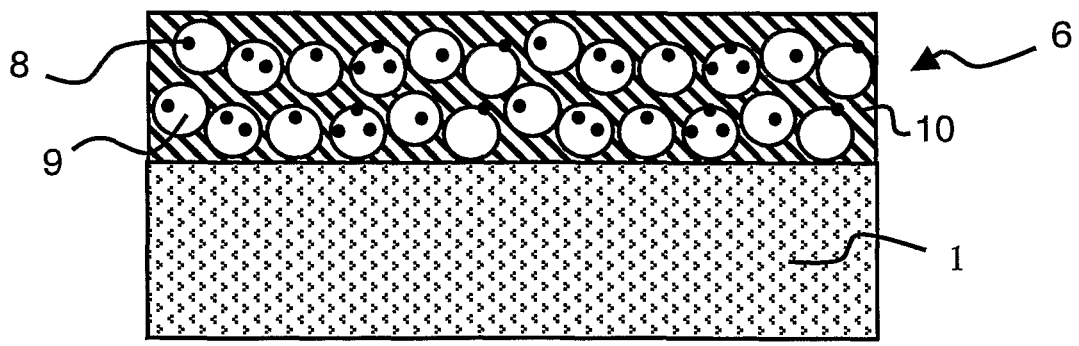
FIGS. 2 and 3 are a schematic cross-section views of a PEM covered by a catalyst layer of the prior art.
Figure 3:
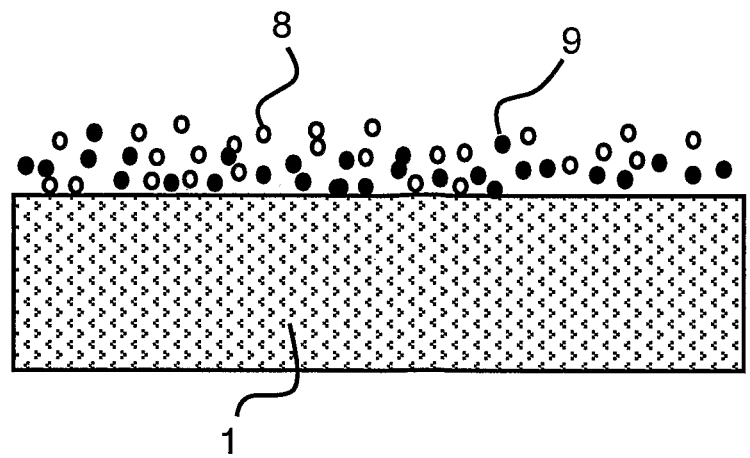
Figure 4:
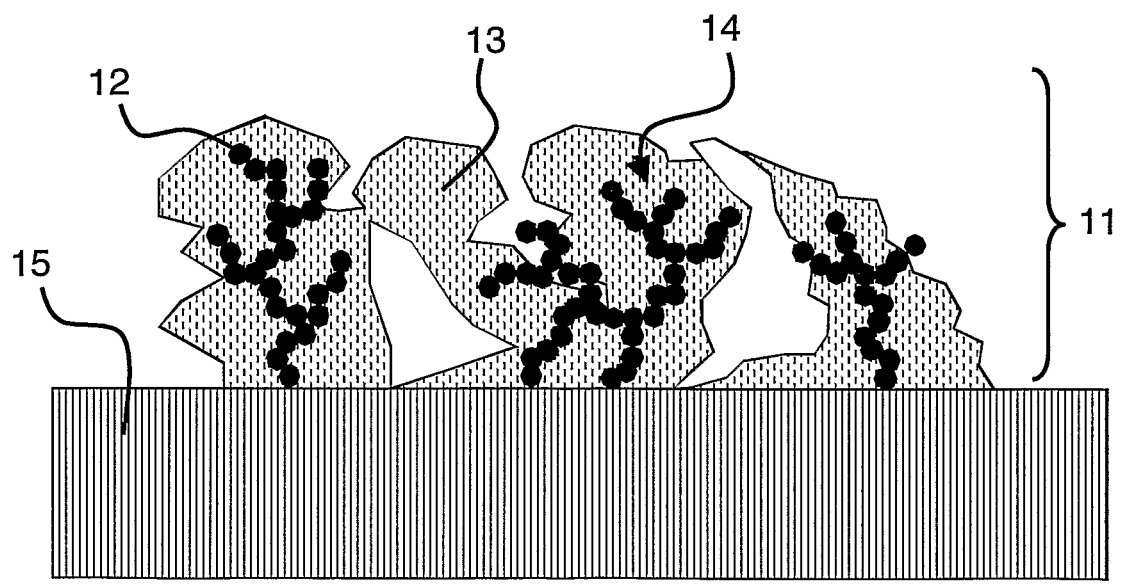
FIG. 4 is a cross-section schematically illustrating a catalyst thin layer according to one embodiment of the invention.
Figure 5:
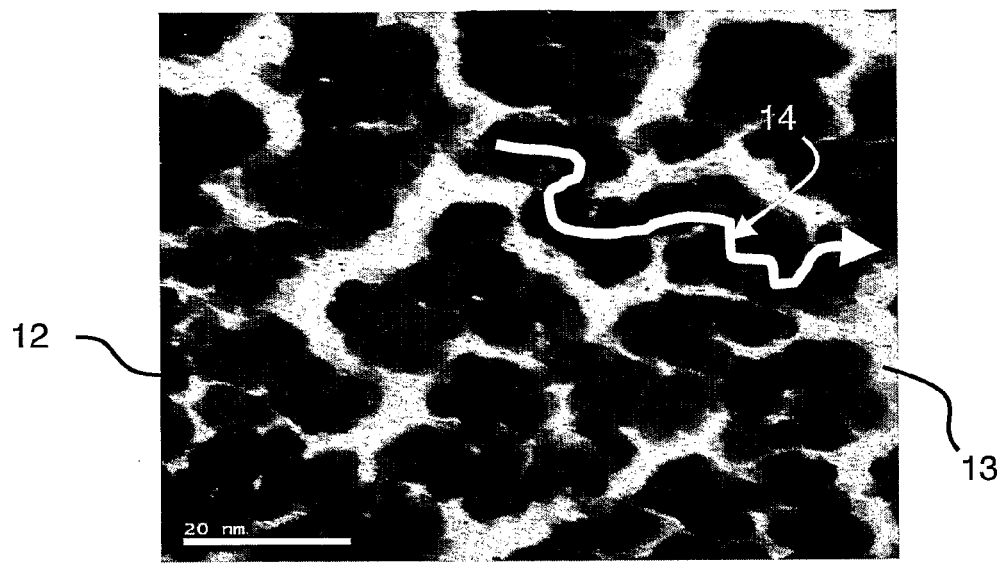
FIG. 5 is, a view of a catalyst thin layer according to FIG. 4, obtained by means of transmission electron microscope (TEM).

Referring to FIG. 4, catalyst thin layer 11 consists of electronically conductive catalyst nano-particles 12 embedded in a polymeric matrix 13. The catalyst thin layer 11 has a preferred thickness less than or equal to 2 µm. The catalyst nano-particles 12 are embedded in the polymeric matrix 13 without any other support and ensure the electronic conduction in the catalyst layer 11 through the percolation mechanism. The suppression of carbon particles 9 according to the prior art, enhances the electronic conduction since catalyst nano-particles 12 have a better conductivity than carbon particles 9. However, at low catalyst atomic percentage, he when the ratio number of catalyst atoms/total number of atoms is low, the electronically conductive catalyst nano-particles 12 are dispersed in the polymeric matrix 13. They are too far from one another to be reached by electrons provided, for example, by electrochemical reactions. On the other hand, at high catalyst atomic percentage, the electronically conductive catalyst nano-particles 12 might form a bulk. In this case, the specific surface, i.e. the total surface area per unit of mass, of the catalyst nano-particles 12 would drop down. Such an aggregation thus involves the reduction of the catalytic effect. Indeed, a high specific surface involves increased contact area between the electronically conductive catalyst nano-particles 12 and reactants. To efficiently contribute to electrochemical reactions and simultaneously allow electron conduction, the catalyst atomic percentage of the catalyst thin layer 11 must be comprised between 40% and 90%, preferably between 50% and 60%. As illustrated in FIGS. 4 and 5, the electronically conductive catalyst nano-particles 12 then form clustered networks 14 in the polymeric matrix 13. These clustered networks 14 create an electronic link between nano-particles 12. This enhances the electron conduction (FIG. 5, white arrow) and thereby improves the electronic conductivity of the catalyst thin layer 11.

The particle size of the electronically conductive catalyst nano-particles 12 is preferably in the range of 3 to 10 nm.

A preferred electronically conductive catalyst is a metal. More particularly, the electronically conductive catalyst may be pure platinum (Pt) or an alloy of Pt and at least another metal, for example, gold (Au), rhodium (Rh), iridium (Ir), ruthenium (Ru), tin (Sn), bismuth (Bi) and molybdenum (Mo). It also may be a mixture of Pt and at least one of the metals above-mentioned. A platinum (Pt) alloy, for example, a Pt—Ru—Bi alloy, is preferably used if carbon dioxide is a by-product of the electrochemical reaction, for example, in abiotic biofuel cell using glucose or methanol as fuel.

The polymeric matrix 13 contributes to strengthening the binding force between the electronically conductive catalyst nano-particles 12 and promotes the formation of the clustered networks 14. The polymeric matrix 13 may be polyolefin, polyfluorocarbon and organometallic polymer or a ionomer.

In a specific embodiment, a Pt catalyst thin layer 11 is coated on a substrate 15 by a vacuum process, advantageously, by physical and chemical vapor deposition (PVD and CVD). The electronically conductive catalyst nano-particles 12 and a precursor of the polymeric matrix 13 are then simultaneously applied on the substrate 15. The latter may be Nafion™ (E. I. DuPont), Flemion™ (Asahi Glass Co.), fluorine-free polymer such as polyethylene and polypropylene, sulfonated polyetherketones or polyarylketones, ceramic materials or even electronically conductive materials, such as a glassy carbon electrode.

Vacuum processes are particularly suitable to realize the catalytic thin layer 11 because they allow the control of the distribution of catalyst nano-particles 12 in a given polymeric matrix 13 for high volume fractions of catalyst nano-particles 12. More particularly, the Pt catalyst thin layer 11 is applied on the substrate 15 by a combination of physical and chemical vapor deposition (PVD and CVD). This process involves placing the substrate 15 to be coated in a vacuum chamber and contacting the substrate 15 with suitable plasma. The properties of the ultimate Pt catalyst thin layer 11 can be controlled by adjusting the composition of the plasma and by varying process parameters, such as pressure and specific sequences of cleaning and etching. Plasma can be generated either by applying RF energy or by applying pulsed DC biased power to the substrate 15 in the presence of a gaseous precursor of the polymeric matrix 13. More preferably, the precursor of the polymeric matrix 13 is selected from the group consisting of hydrocarbon, fluorocarbon and organometallic.

For example, a substrate 15 formed by a glassy carbon electrode of 5 mm of diameter has been coated by RF PVD. A catalytic metal target, for example a catalytic Pt target, has been physically sputtering with a radio frequency plasma under a gas stream of gaseous ethane and an inert gas or a mixture of inert gases. Gaseous ethane then constitutes the precursor of a polyolefin matrix constituting the polymer matrix 13. The sputtering conditions may be varied according to the size of the electronically conductive catalyst nano-particles 12.

The glassy carbon electrode constituting the substrate 15 has previously be pre-treated as follows. The glassy carbon electrode is polished with diamond paste down to 1 μm and washed for 15 mm in three successive ultrasonic baths of acetone, ethanol-water (1-1) and water. The plasma is created by RF powered electrode (power between 10 and 800 W, preferably 100 W). The chamber is preferably pumped down to vacuum at 1 mTorr or less, and then a gas pressure is maintained between 1 mTorr to 1000 mTorr (preferably 100 mTorr) with a gas stream of gaseous ethane and inert gas, preferably argon (Ar). The gas flow rate is maintained at 0.5 sccm (standard cubic centimeter per minute) for gaseous ethane and at 45 sccm for argon. By maintaining these conditions during a deposition time of 30 mm, a Pt catalyst thin layer 11 with a catalyst atomic percentage of 54% is obtained. Different amounts of catalytic Pt loading may be obtained by varying the plasma power. The sputtering conditions are adjusted to form a Pt catalyst thin layer 11 with the desired thickness and with nano-particles of a given size. The sputtering may be carried out either in one step process or in several steps.

Figure 6:
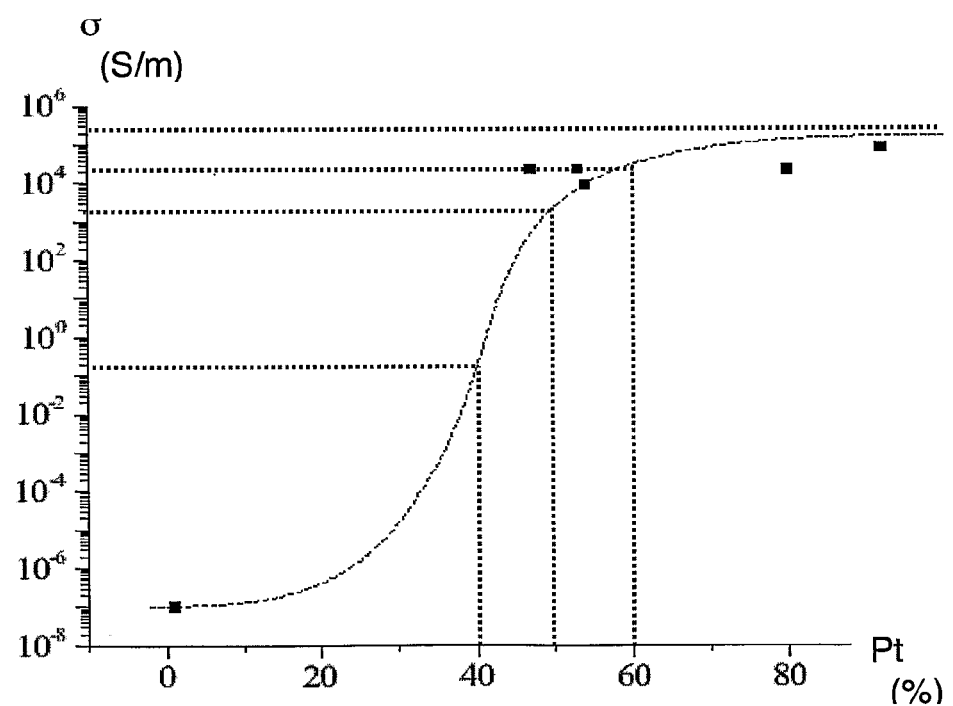
FIG. 6 is a graph illustrating the variations of conductivity ($\sigma$) with respect to the platinum atomic percentage of a catalyst thin layer comprising Pt nano-particles.

The conductivity ($\sigma$) of several Pt catalyst thin layers 11 with respectively 9, 40, 47, 54, 58, 68 and 78 catalyst atomic percentages of Pt have been measured. As shown on FIG. 6, the conductivity increases rapidly between 20% and 40% and remains practically constant about 50%, where it reaches a maximum value of $10^5$ S/m.

Figure 7:
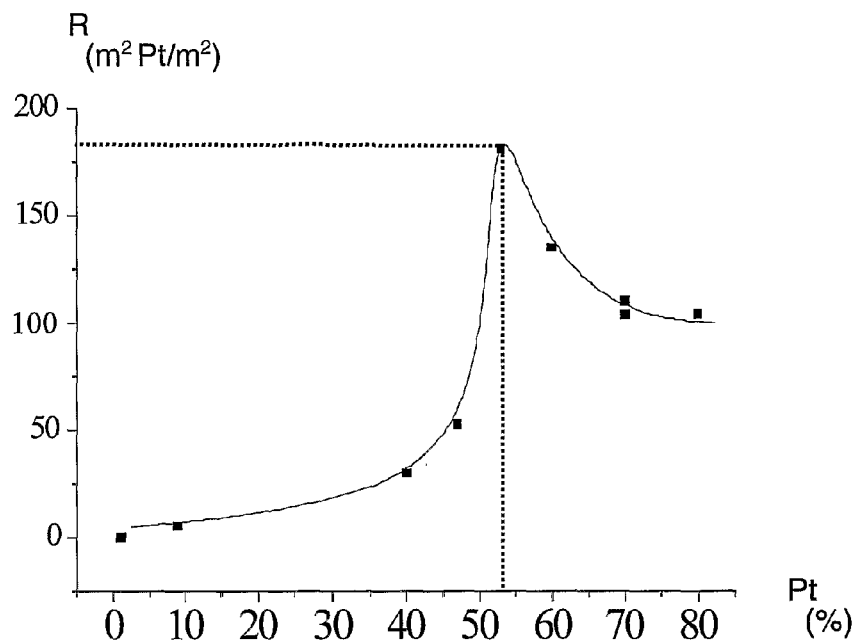
FIG. 7 is a graph illustrating the variations of roughness (R) with respect to the platinum atomic percentage of a catalyst thin layer comprising Pt nano-particles.

The roughness (R), which is representative of the specific surface area of a Pt catalyst thin layer 11, may also be evaluated by means of any known technique, for example, hydrogen-adsorption/desorption coulometry. A electrochemical three-electrodes cell is used to perform this technique (working, auxiliary and reference electrodes). The working electrode is a rotating disk electrode (RDE). Experiments are carried out in 1M sulphuric acid solution at room temperature. The electrochemical cell is deaerated by inert gas, for example nitrogen ($N_2$) bubbling in the solution for 30 min. The inert gas stream is then held above the solution and ten voltammetric cycles at $0.1 V \cdot s^{-1}$ (−0.05 to +1.5V/NHE) are applied to clean the Pt catalyst thin layer 11 surface. A voltammogram is then monitored in the same potential range. The specific surface area of platinum is determined by integrating the current density vs time curve under the hydrogen-desorption peak. A roughness factor R ($m^2$ Pt/$m^2$ geometric) can be therefore deduced from the coulometric charge under this peak using the well-known relationship of 200 $\mu C \cdot cm^{-2}$ of platinum. FIG. 7, graphically illustrates the roughness factor R vs. Pt catalyst atomic percentage. A peak of roughness of about 170 $m^2$ Pt/$m^2$ is observed at about 53% of Pt.

So, by selection of the catalyst atomic percentage of Pt in the range of 40% to 90%, more preferably, between 50% and 60%, combines the enhance effects due to a high specific surface area of Pt and to a high conductivity.

The catalyst thin layer 11 can also be obtained by conventional processes of serigraphy, enduction, spin coating or dip coating of a ink or a paste. The latter are generally prepared by blending the electronically conductive catalyst nano-particles 12 and the precursor of the polymer matrix 13 to form the ink or the paste, next applying the said ink or paste on the substrate 15 and then polymerizing the precursor, for example, by thermal treatment.

The catalyst thin layer 11 is advantageously used in a catalytic electrode of a fuel cell and, more particularly, of a PEM fuel cell. The latter comprises an electronically conductive layer 16 covered at least partially by the catalyst thin layer 11. Very thin catalytic electrodes, having a thickness less or equal to 2 μm, can be provided with the catalyst thin layer 11 of the present invention.

The catalyst thin layer 11 is also particularly well suited for a use in a membrane-electrode assembly (MEA). The substrate 15 constituting the PEM 1, and the polymeric matrix 13 can be made of the same material, for example Nafion™. The catalyst thin layer 11, preferably metal catalyst thin layer, more preferably Pt catalyst thin layer, can be coated on both sides of the PEM 1. The latter is then sandwiched between a first electrode and a second electrode, for example, a conductive carbon cloth or a carbon paper. Next, electrodes are hot pressed to form a complete MEA.

The catalyst thin layer 11 can be coated only on one side of the PEM 1 or on both.

The resulting MEA may be included in different kinds of fuel cells, such as solid alkaline fuel cell (SAFC) or solid oxide fuel cell (SOFC). More preferably, the resulting MEA is used in a PEM fuel cell.

The catalyst thin layer 11 of the present invention is particularly suitable for systems needing a very thin catalyst layer, i.e. with a thickness less than or equal to 2 μm, like three dimensional fuel cells or microsystems.

Figure 8:
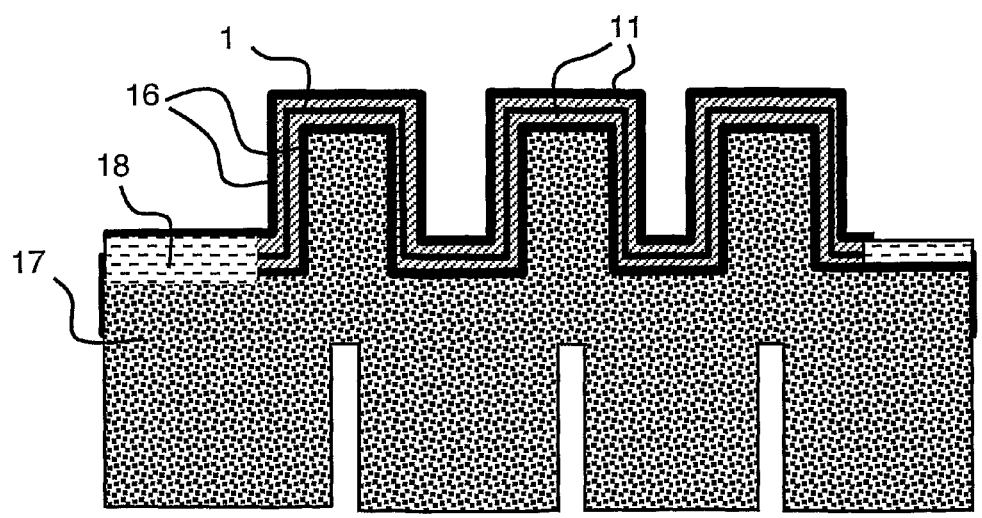
FIG. 8 is a cross-section schematically illustrating a three-dimensional fuel cell comprising a catalyst thin layer according to the invention.

In a specific embodiment, illustrating in FIG. 8, a three dimensional fuel cell comprising catalyst thin layers 11, is formed on a patterned ceramic layer 17, advantageously porous. The pattern 17 preferably comprises an alternation of ribs separated by grooves. The dimensions of the pattern are generally in the range of 100 μm to 200 μm. The three dimensional fuel cell comprises a stack of the successively following layers provided on the patterned ceramic layer 17:

a first electronically conductive layer 16, preferably a gold layer, a first catalyst thin layer 11 according to the invention, preferably metal catalyst thin layer, more preferably Pt catalyst thin layer, with a thickness of 2 μm, a PEM 1, preferably a Nafion™ layer, a second catalyst thin layer 11, preferably metal catalyst thin layer, more preferably Pt catalyst thin layer, with a thickness of 2 μm, and a second electronically conductive layer 16, preferably a gold layer.

The stack forms a series of undulations, according to the pattern formed on the surface of the ceramic layer 17.

Classically a dielectric 18, for example silicon oxide, is provided at the periphery of the above-described stack, between the first and the second electronically conductive layers 16, preferably forming metallic collectors constituting the terminals of the fuel cell.

Advantageously, the direct coating of electronically conductive catalyst nano-particles 12 on a substrate 15, more particularly on a PEM 1, reduces the amount of catalyst required in the catalyst thin layer 11, reduces the thickness of the catalyst thin layer 11 and improves the efficiency of the gas reactions.

The catalyst thin layer 11 can also be used in sensor systems such as hydrogen, oxygen or glucose detectors and also in energetic systems such as catalyst combustion systems.

The invention claimed is:

1. A catalyst thin layer consisting of clustered networks of electronically conductive catalyst nano-particles embedded in a polymeric matrix, with a ratio number of catalyst atoms/total number of atoms is between 50% and 60%, wherein the particle size of the electronically conductive catalyst nano-particles is in the range of 3 to 10 nm, and the catalyst thin layer has a thickness less than or equal to 2 μm.

2. The catalyst thin layer in accordance with claim 1, wherein the catalyst is selected from the group consisting of pure platinum (Pt), alloy and mixture of Pt and at least one metal selected from the group consisting of gold (Au), rhodium (Rh), iridium (Ir), ruthenium (Ru), tin (Sn), bismuth (Bi) and molybdenum (Mo).

3. The catalyst thin layer in accordance with claim 1, wherein the catalyst is a Pt—Ru—Bi alloy.

4. The catalyst thin layer in accordance with claim 1, wherein the polymeric matrix is selected from the group consisting of polyolefin, polyfluorocarbon and organometallic polymer.

5. The catalyst thin layer in accordance with claim 1, wherein the polymeric matrix is a ionomer.

6. The catalyst thin layer in accordance with claim 1, wherein said catalyst thin layer has an electronic conductivity more than or equal to $10^5$ S/m.

7. A catalytic electrode of a fuel cell comprising an electronically conductive layer covered at least partially by the catalyst thin layer according to claim 1.

8. A method for fabricating the catalyst thin layer according to claim 1, wherein the electronically conductive catalyst nano-particles and a precursor of the polymeric matrix are simultaneously applied on a substrate.

9. The method in accordance with claim 8, wherein the catalyst is a metal catalyst and the catalyst thin layer is applied on the substrate by a combination of physical and chemical vapor deposition (PVD and CVD) with a catalytic metal target and a plasma comprising the precursor of the polymeric matrix.

10. The method in accordance with claim 8, wherein the precursor of the polymeric matrix is selected from the group consisting of hydrocarbon, fluorocarbon and organometallic.

* * * * *